US006916244B2

(12) United States Patent
Gatto et al.

(10) Patent No.: US 6,916,244 B2
(45) Date of Patent: Jul. 12, 2005

(54) SERVER-LESS CASHLESS GAMING SYSTEMS AND METHODS

(75) Inventors: Jean-Marie Gatto, London (GB); Thierry Brunet de Courssou, Palo Alto, CA (US)

(73) Assignee: Cyberscan Technology, Inc., Palo Alto, CA (US)

(*) Notice: Subject to any disclaimer, the term of this patent is extended or adjusted under 35 U.S.C. 154(b) by 386 days.

(21) Appl. No.: 10/163,177

(22) Filed: Jun. 5, 2002

(65) Prior Publication Data

US 2003/0228907 A1 Dec. 11, 2003

(51) Int. Cl.[7] .................................................. A63F 13/00
(52) U.S. Cl. .......................................................... 463/25
(58) Field of Search ................................ 463/1, 25, 27, 463/29, 39, 40, 43

(56) References Cited

U.S. PATENT DOCUMENTS 4,636,951 A * 1/1987 Harlick ........................ 463/25
5,265,874 A 11/1993 Dickinson et al.
5,290,033 A 3/1994 Bittner et al.
5,674,128 A 10/1997 Holch et al.
5,766,076 A * 6/1998 Pease et al. .................. 463/27
5,800,269 A 9/1998 Holch et al.
6,048,269 A 4/2000 Burns et al.
6,089,982 A 7/2000 Holch et al.
6,168,522 B1 * 1/2001 Walker et al. ................ 463/25
6,280,328 B1 8/2001 Holch et al.
RE37,414 E * 10/2001 Harlick ........................ 463/25
6,537,151 B1 * 3/2003 Walker et al. ................ 463/25
6,547,131 B1 * 4/2003 Foodman et al. ............. 463/25
6,585,598 B2 * 7/2003 Nguyen et al. ............... 463/41
6,607,441 B1 * 8/2003 Acres .......................... 463/25
6,743,097 B2 * 6/2004 Walker et al. ................ 463/25
6,749,510 B2 6/2004 Giobbi

FOREIGN PATENT DOCUMENTS

WO WO 01/41892 A2 6/2001

* cited by examiner

*Primary Examiner*—Xuan M. Thai
*Assistant Examiner*—Robert Mosser
(74) *Attorney, Agent, or Firm*—Young Law Firm, P.C.

(57) ABSTRACT

Methods and systems that enable cashless gaming dispense with the need to set up and operate a complex centrally controlled system or dispense with the need to distribute expensive smart cards. The patrons' gaming session meters (including, for example, a measure of winning and/or available credit) are distributed amongst an estate of peer networked gaming terminals.

52 Claims, 5 Drawing Sheets

SERVER-LESS CASHLESS GAMING SYSTEMS AND METHODS

BACKGROUND OF THE INVENTION

1. Field of the Invention

This invention relates generally to the field of pay computer-controlled games, either games of skills or games of chance, and more particularly to the field of cashless gaming systems and methods.

2. Description of the Related Art

Conventional cashless methods and systems typically rely on centralized accounts (player accounts, anonymous game session accounts, voucher verification accounts, smartcard reconciliation accounts) that are managed by a complex central system (i.e., controlled or coupled to a central server). Such systems require the services of highly trained professionals and the maintenance of stringent security procedures. This leads to high operational costs that are not acceptable for small to medium sized gaming operators. Centralized systems of the prior art are described in U.S. Pat. No. 6,280,328, U.S. Pat. No. 5,265,874 and U.S. Pat. No. 6,048,269.

What are needed, therefore, are cashless gaming methods and systems that overcome the complexity, cost and manpower of conventional gaming methods and systems.

SUMMARY OF THE INVENTION

It is, therefore, an object of this invention to offer gaming terminals and network architectures, systems and methods that overcome the complexity, cost and manpower inherent in conventional gaming terminals, network architectures, methodologies and systems.

According to embodiments of the present invention, each networked gaming terminal comprises a highly secure enclosure because of the strict regulations that are imposed in gaming jurisdictions. The compute modules thereof are carefully partitioned with multiple locking mechanisms and alarm systems. Strict procedures must be followed to access various parts and functions. Furthermore, the computer architecture and components of motherboards used in gaming machines are becoming enormously powerful and extremely reliable due to the technology advancements; they are identical to those used in computer servers that constitute complex central systems. Therefore, networked gaming terminals may offer an exceptionally secure and exceedingly powerful computing environment.

In the present invention, the gaming terminals are advantageously configured to support functions traditionally implemented by centralized systems. Gaming terminal software is adapted to support, in addition to the local terminal game session metering (including, for example, tracking of winning and available credits), the game session metering of one or a plurality of peer gaming terminals. A patron may deposit funds in cash or using any other financial instrument (including, for example, any form of electronic money) to a cashier or an automated network cashier, or alternatively a gaming terminal equipped with cash acceptors or other financial instrument acceptors. According to an embodiment of the present invention, the amount of money deposited by the patron is credited by the cashier, or gaming terminal or using a basic stateless (i.e. not managing the session context) entry terminal, into a peer gaming terminal or alternatively, the equivalent operation may be automatically performed by the automated network cashier. In the case of a gaming terminal equipped with financial instrument acceptors, the credit is entered directly into the local meters (i.e., not stored in memory prior to being transferred to the local meters of the gaming terminal). The patron may be issued an identification (ID) instrument that may be accepted by any gaming terminal in the network. Each time the patron submits his ID instrument (or is otherwise authenticated) to a new gaming terminal on the network, the new gaming terminal may broadcast a network message to request the previously used gaming terminal to transfer to the new terminal the game session meters corresponding to the ID instrument. That is, the request may be broadcast to all gaming terminals on the network and only the gaming terminal owning the requested game session meters will respond to the broadcast request. Consequently, the patron may play on any gaming terminal within the network and change gaming terminal at any time as long as his game session credit is not exhausted. The transfer of meters preferably occurs directly between the networked gaming terminals, without the intermediary of an intervening terminal or storage.

The patron may redeem his winnings or remaining credits by submitting his ID instrument to an automated cashier, to a cashier equipped with a network entry terminal or to a gaming terminal equipped with a coin dispenser or a bank note dispenser. For the payment operation, payment authorization may be obtained via the network from the last gaming terminal on which the patron last played.

For fault tolerance, each game session meter may be mirrored on one or a plurality of peer gaming terminals on the network.

It is a further object of this invention supports all forms of cashless instruments such as:

- a player account whereby primary meters are the monetary credit balance associated to a patron ID;
- an anonymous game session account whereby primary meters are the monetary credit balance associated to a game session ID;
- a voucher verification account whereby the primary meters are the monetary value and the hash associated to the value amount and the encrypted signature printed or encoded on the voucher;
- a time gaming account whereby the primary meters are the time-to-play balance and the total of the winnings associated to a patron ID or to a game session ID;
- a smartcard reconciliation account whereby the primary meters are a mirrored copy of the meters managed in the secure electronic module of the smartcard.

DESCRIPTION OF THE INVENTION

Reference will now be made in detail to the construction and operation of preferred implementations of the present invention illustrated in the accompanying drawings. The following description of the preferred implementations of the present invention is only exemplary of the invention. Indeed, the present invention is not limited to these implementations, but may be realized by other implementations.

Figure 1:
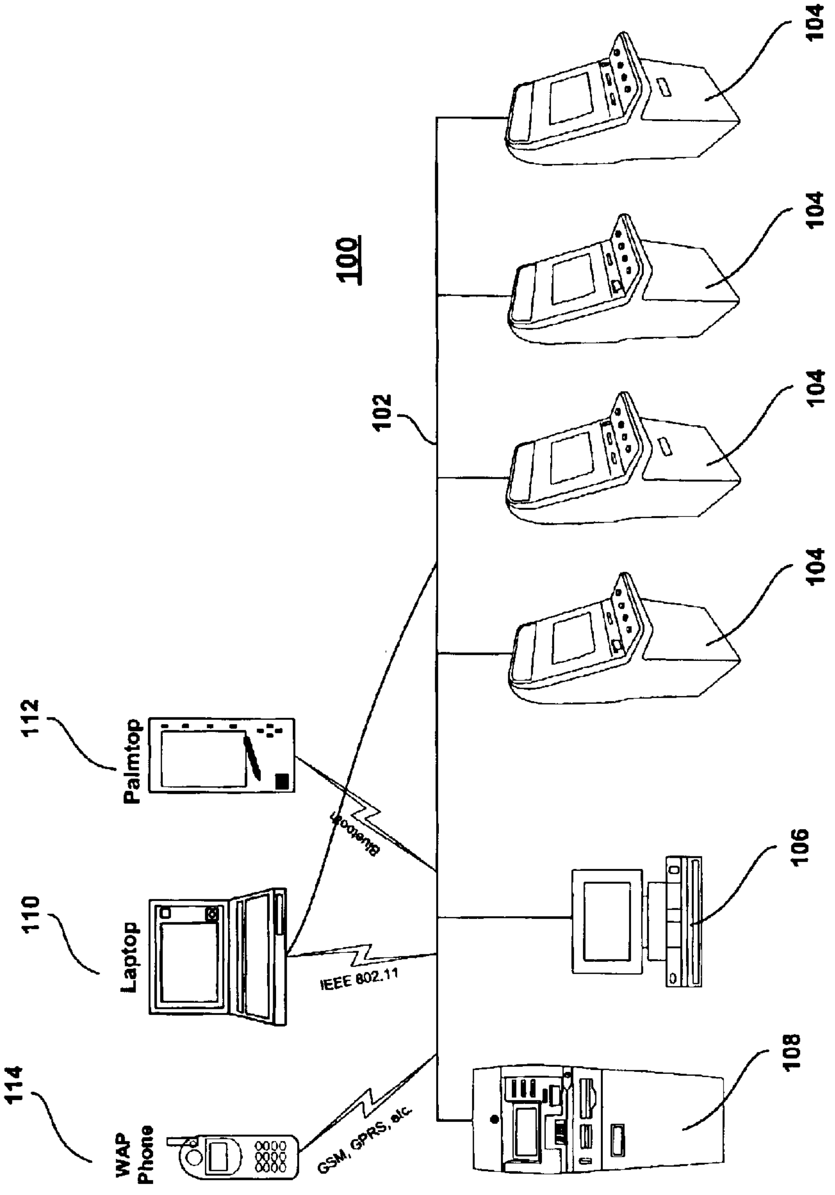
FIG. 1 is an overview diagram of an exemplary server-less cashless gaming system, in accordance with an embodiment of the present invention.

FIG. 1 is an overview diagram of an exemplary serverless cashless gaming system, in accordance with an embodiment of the present invention. As shown therein, a serverless gaming system 100 according to an embodiment of the present invention may include a plurality of gaming terminals 104, a cashier terminal 106 or an automated cashier 108, all communicating via a wired and/or wireless network 102. Wireless entry devices such as laptops 110 using 802.11 (for example), palmtops 112 using Bluetooth or 802.11 (for example), or Wireless Application Protocol (WAP) phones (for example) may advantageously be used in some premises for operators to consult and credit the game session meters. Advantageously, there is no central system (i.e., central server) controlling the gaming system 100.

Figure 2:
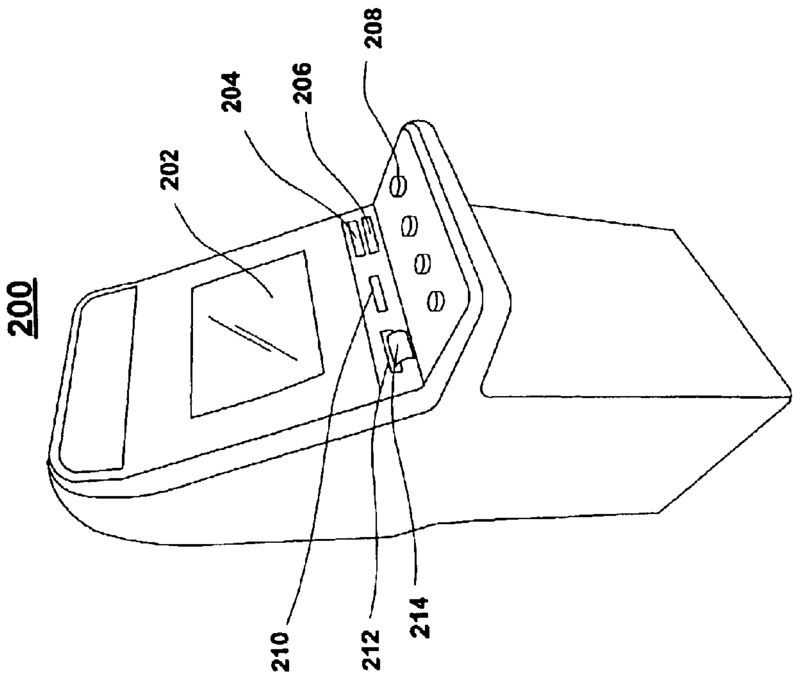
FIG. 2 is a view depicting an exemplary cashless game terminal in accordance with an embodiment of the present invention.

FIG. 2 illustrates an exemplary cashless gaming machine 200 that does not accept or redeem cash. It is to be understood that the gaming machine 200 is but one possible implementation of such a cashless gaming machine and that the present invention is not limited thereto. For cashless operation, the gaming terminal is equipped with means of capturing the encoded information associated with a cashless instrument submitted. The cashless instrument may be a physical portable instrument such as: a paper voucher comprising printed codes; a strong paper ticket comprising printed codes and encoded magnetic codes; a rigid ID card comprising printed codes, magnetic codes or optical codes; a secure contact or contact-less electronic ID device comprising sophisticated electronic (a smart card or a smart dongle); or alternatively, a user ID and password to be typed or spoken, or alternatively again advanced biometric features (finger print, voice recognition, face recognition). The information captured from a cashless instrument is processed in order to derive a pointer to a location containing the necessary computer data to identify and validate the cashless instrument. The information captured from a cashless instrument may contain an encrypted signature (or hash) to ensure that the information has not been maliciously modified. In fine, the cashless instrument allows to derive a valid "identifier code" that is used by the software to execute the appropriate transactions to emulate the use of real cash for the cashless instrument submitted. The cashless instrument is thus denoted "ID instrument" hereafter. The ID instrument may be capable of storing additional information when accessed by a device, or alternatively be replaced by a new one (i.e. a newly printed ticket). The gaming machine ID device(s) accepting the ID instrument submitted may include a magnetic card reader 204, a SmartCard reader and writer 206, a barcode reader 210, a ticket printer 212, a biometric reader (finger print, voice identification, head identification, etc.), a touch-screen 202, keyboard or keypad to enable players to enter a PIN (Personal Identification Number). The gaming machine identification device(s) may further include an ID token reader to read other forms of advanced ID devices such as ID buttons, ID key-chains (such as disclosed, for example in commonly assigned US design patent entitled "Personal Communicator and Secure ID Device" Pat. No. D441,765 issued on May 8, 2001) as well as secure communication means for securely communicating with, for example, personal wallets, hand held computers or computer wrist-watch via infra red, magnetic field, capacitive charges or RF (Bluetooth, IEEE 802.11, etc.) for player identification purposes. A printer 212 may print bar-coded tickets 214 that can be read by a barcode reader 210.

Figure 6:
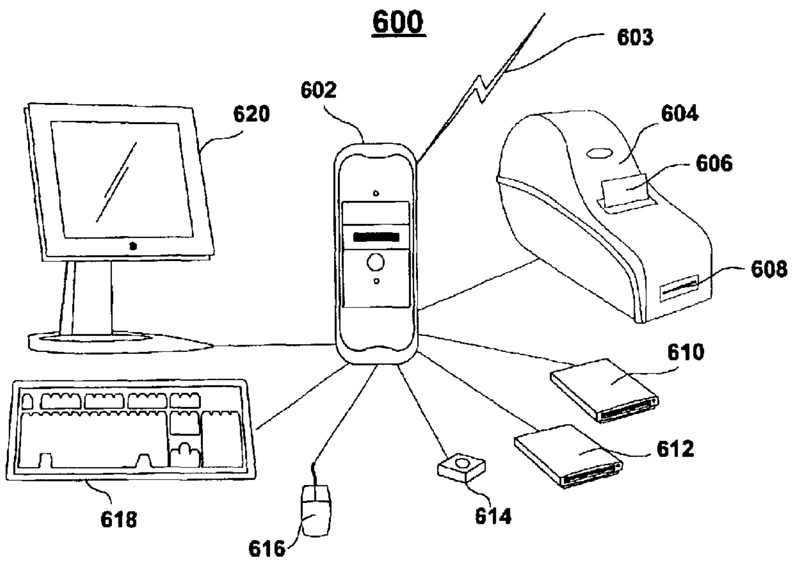
FIG. 6 is a view depicting an exemplary cashier network entry terminal in accordance with an embodiment of the present invention.

FIG. 6 illustrates an example of a networked cashier terminal 600, according to an embodiment of the present invention. The terminal may include a computer 602 connected via wired or wireless link 603 to the network 102 with the gaming machines 104 and a ticket printer 604. The ticket printer 604 may include an integrated printer for printing tickets or receipts 606 that include a human and/or machine readable code imprinted thereon and code reader 608 for reading the code(s) imprinted on the ticket 606. The cashier terminal may also include, for example, a magnetic card reader 610, a SmartCard reader 612, a biometric reader 614 (such as a fingerprint reader, for example), a display 620 and input devices such as a keyboard 618 and/or a mouse 616. The cashier terminal may be controlled by an operating system capable of secure network communication such as Microsoft Windows, embedded XP or Linux, for example.

Figure 3:
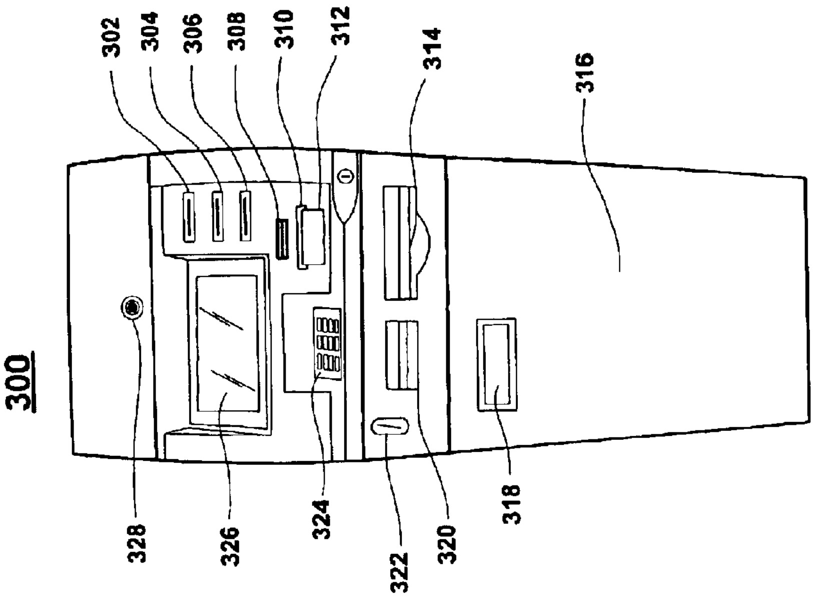
FIG. 3 is a view depicting an exemplary automated cashier in accordance with an embodiment of the present invention.

FIG. 3 illustrates an embodiment of an automated cashier 300, which dispenses with the need for a human cashier. The automated cashier 300 may include an internal computer connected to the network 102 with the gaming terminals 104, a coin acceptor 322, a note acceptor 320, a coin dispenser/hopper 318, a SmartCard or magnetic card dispenser 304, a note dispenser 314, a ticket printer 310 for printing a ticket 312, a magnetic card reader 302, a SmartCard reader/writer 306, a barcode reader 308, display with touch-screen 326, a keypad 324, a video camera 328 and/or a UL 291 certified cash safe 316, for example. The UL 291 certified cash safe 316 prevents or deters robbery of the cash stored inside the automated cashier 300. The automated cashier 300 may further include biometric ID readers, ID token readers to read other forms of advanced ID devices such as ID buttons, ID key-chains, etc., as well as secure communications means for communicating with personal wallets, hand held PCs or computer wristwatch via infrared, magnetic field, capacitive charges or RF (Bluetooth, IEEE 802.11, etc.) for identification purposes.

Figure 4:
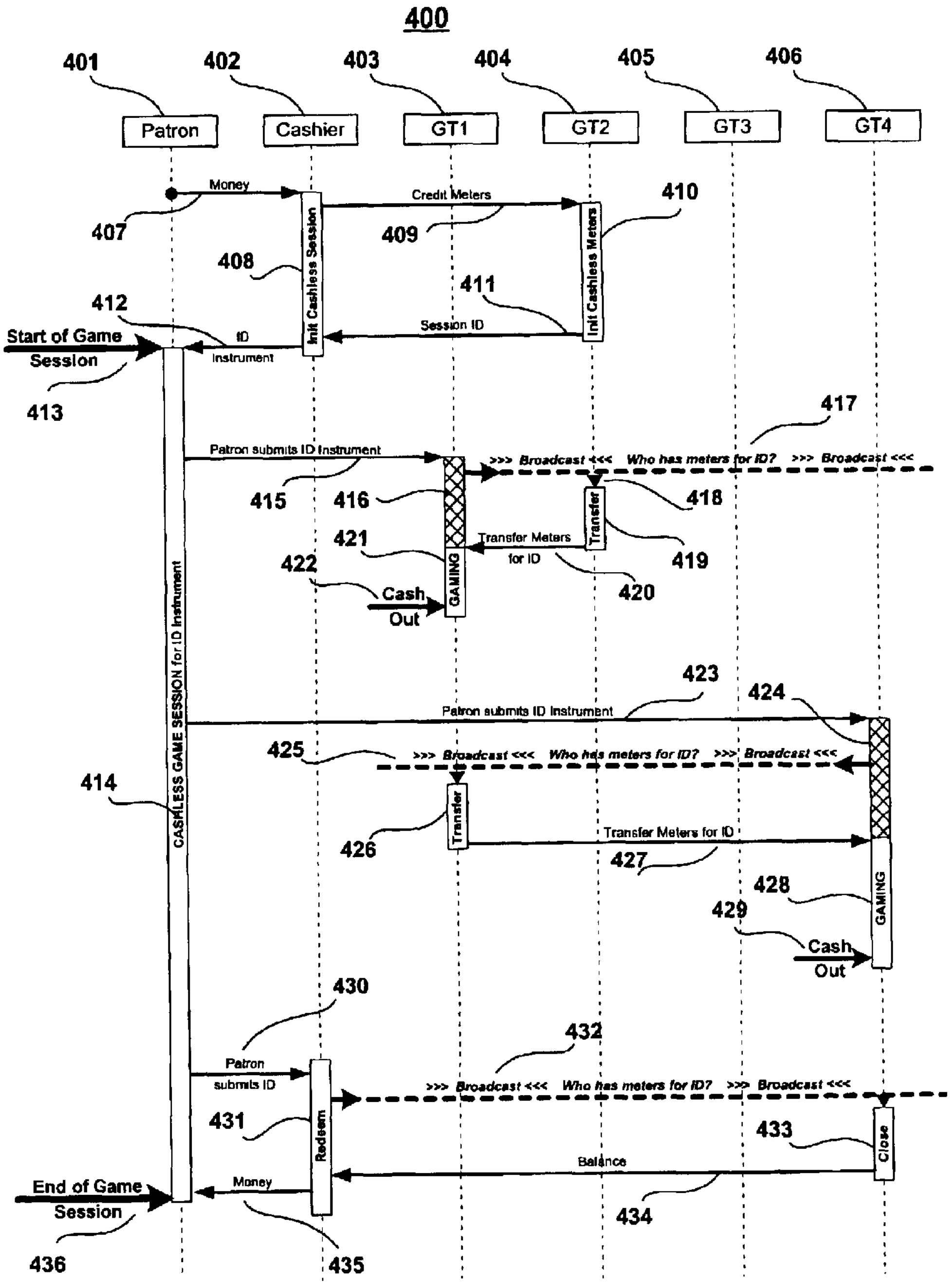
FIG. 4 is a diagram depicting a server-less cashless game session in accordance with an embodiment of the present invention.

According to one embodiment of the present invention, the gaming terminals (GT) 104 are advantageously configured to support functions traditionally implemented by central systems. FIG. 4 illustrates an embodiment of a serverless cashless gaming session according to the present invention. A patron 401 initially interacts with a cashier 402 to establish a cashless session 407 through to 412. The patron 401 initializes a cashless session 408 by handing over an amount of money 407 (in whatever form) to the cashier 402. The cashier 402 initializes the cashless meters 410 located on a predetermined gaming terminal 404 by issuing a credit meters transaction 409 using a cashier terminal 600. The gaming terminal 404 executes a process 410 to initialize in persistent storage the cashless meters associated with this cashless session. The gaming terminal 404 may then return a session ID 411 for later access and retrieval. The cashier 402 may complete the cashless session 408 by providing the patron 401 with an ID instrument 412 corresponding to session ID 411. The ID instrument 412 may be or include a printed ticket with text and/or encoded barcode, a printed ticket with text and/or embedded encoded magnetic strip (such as a metro ticket, for example), a magnetic ID card, a smart ID card, fingerprint recognition, voice recognition, face recognition, palm recognition (or any biometric recognition), ID buttons, ID key-chains, a personal electronic wallet, a secure handheld Computer, a secure mobile phone a secure computer wrist watch, a bar-coded ticket, a bar-coded voucher or any imaginable way to associate identification means with a physical or electronic media. A PIN number may also be given for challenging the ID instrument. The identification of the cashless session may be entirely anonymous or alternatively, may be associated with the patron's identity or membership in some group. In the later case, necessary personal identification data may be captured by the cashier when money is deposited 407 and are submitted together with the credit meters 409 for persistent storage in the gaming terminal 404 during the process 410.

The exact same cashless session 407 through 412 may be performed by making use of the automated cashier 300 instead of the cashier terminal 600 wherein the role of the cashier 402 is replaced by an automated program executed in the automated cashier. Suitable peripherals may be attached to the automated cashier 300 to allow for the deposit of funds, capture of information and dispensing of ID instruments.

The start 413 of a cashless game session 414 may be identified by the patron 401 receiving the ID instrument 412. The end 436 of the cashless game session 414 may be identified by the patron 401 redeeming the credit balance of money 435 associated with his ID instrument 412, or when the credit associated with his ID is exhausted (null).

The patron 401 (who forms no part of the present invention and whose actions are only described herein to illustrate aspects of the present invention), subsequent to receiving an ID instrument 412, may execute a certain number of cashless operations associated with his ID instrument. The patron may choose any gaming terminal 403, 404, 405 or 406 to play on. In the illustration of FIG. 4, the patron first chooses the gaming terminal 403 and submits his ID instrument 415 to the gaming terminal 403. If the gaming terminal 403 does not have ownership of the cashless meters associated with the ID instrument submitted, it may immediately broadcast on the network 102 a request to acquire the cashless meters associated with the patron's ID instrument. All the gaming terminals on the network 102 intercept the broadcast. The gaming terminal 404 having ownership of the cashless meters initiates at 418 a transfer procedure 419 to transfer ownership and full content of the cashless meters associated with the ID 420 to the gaming terminal 403. Upon receiving ownership and content of the cashless meters, gaming terminal 403 initializes its local game meters with the value of the cashless meters received and enters a gaming session 421 wherein the patron may play continuously until credit is exhausted or until the cash-out signal 422 is activated. Any winning is added to the patron's credit balance.

When the cash-out signal 422 is activated by the patron, the player may use the remaining of his or her credit to play on another gaming terminal or redeem the credit for cash. A ticket showing the credit remaining may be printed if a printing device is available on gaming terminal 403. In the illustration of FIG. 4, patron 401 chooses to play on gaming terminal 406 and submits his ID instrument 423 to the gaming terminal 406. Gaming terminal 406 does not have ownership of the cashless meters associated with the ID instrument submitted. Therefore, it may immediately broadcast on the network a request to acquire the cashless meters associated with the ID instrument. All the gaming terminals on the network intercept the broadcast. The gaming terminal 403 having ownership of the cashless meters initiates a transfer procedure 426 to transfer ownership and full content of the cashless meters associated with the ID 427 to the gaming terminal 406. The gaming terminal 403 may deny the transfer of the meters if credit is exhausted or already paid, thus preventing the patron from playing on gaming terminal 406. Upon receiving ownership and content of the cashless meters, gaming terminal 406 initializes its local game meters with the value of the cashless meters received and enters a gaming session 428 wherein the patron may play continuously until credit is exhausted or until the cash-out signal 429 is activated. Any winning is added to the credit balance.

When the cash-out signal 429 is activated, the player may use any remaining credit to play on another gaming terminal or may redeem the credit for cash (or for credit on another payment instrument or account). A ticket showing the credit remaining may be printed if a printing device is available on gaming terminal 406. In the illustration of FIG. 4, patron 401 chooses to redeem his credit for cash. The patron submits his ID instrument at 430 to the cashier 402 who initiates a redeem process 431 that may immediately broadcast on the network a request to acquire the cashless meters associated with the ID instrument submitted 430. All the gaming terminals on the network intercept the broadcast. The gaming terminal 406 having ownership of the cashless meters authorizes payment by initiating a closure process 433 to terminate ownership of the cashless meters and forward the credit balance amount to pay at 434 to the cashier terminal 402. The gaming terminal 406 may deny payment if credit is exhausted. Upon receiving the authorization from gaming terminal 406, the cashier 402 then hands over the associated money 435 to the patron 401. The cashless game session associated with the ID instrument 414 terminates 436 when the patron receives his money 435. It is understood that the actions of the cashier described herein may be readily automated.

In another embodiment of the present invention, the patron may request partial payment of the credit available. In that case, the gaming terminal 406 having ownership of the cashless meters associated with the patron or the patron's ID instrument authorizes payment and initiates an update process instead of a closure process 433 in order to reflect the amount of payment made. Subsequently, the patron may continue to play on any gaming terminal or later redeem his credits at a cashier using his ID instrument.

For clarity of illustration, the server-less gaming session 400 of FIG. 4 shows only four game terminals and one cashier operating over a peer-to-peer platform. This is an ideal scenario for small game operators. It should be apparent to those acquainted with modem network architectures that the peer-to-peer architecture disclosed herein is highly scalable and robust and that the scenario 400 can be extended to a large gaming estate comprising tens of thousands of gaming terminals and hundreds of cashier terminals or automated cashiers. Moreover, peer-to-peer mechanisms may be provided by modem operating systems such as Microsoft .NET and secure network protocols may be automatically activated by setting the appropriate security policy such as Internet Protocol Security (IPSec) or Secure Socket Layer (SSL), for example. Furthermore, cashier terminals 600 and automated cashier 300 only require simple "stateless".NET client applications or web browser sessions for interacting with the gaming terminals 104. The term "stateless" denotes that the software that executes in the cashier terminal 600 and in the automated cashier 300 is not responsible for managing and recording the game session implicit state or context. The context of a software session is the ordered sequence of properties of the software objects that defines it at a particular instant in time. The context (or implicit state) of a cashless gaming session is controlled and recorded by the gaming terminal that owns the associated cashless session meters. The context of a cashless gaming session includes the meters. The gaming terminal may advantageously store the game session context that includes the meters in a non-volatile memory for fault-tolerance.

Figure 7:
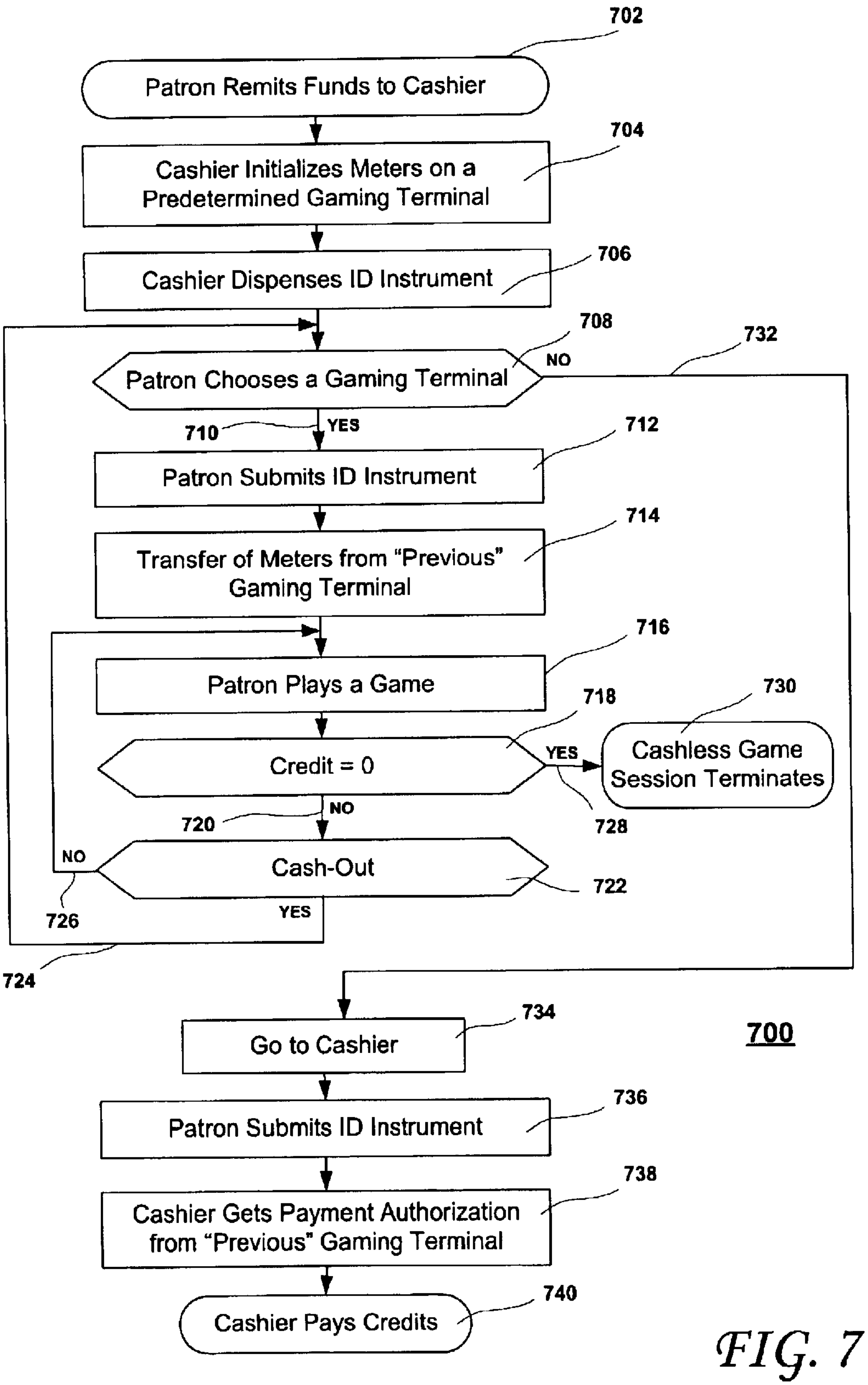
FIG. 7 is a flowchart depicting the cashless meters in accordance with an embodiment of the present invention.

The method and a server-less gaming session 400 of the present invention and illustrated on FIG. 4 is further illustrated in a flowchart 700 of FIG. 7. As shown, a patron remits funds to any of the cashiers at 702, whereupon the cashier initializes meters on a predetermined gaming terminal at 704 and the cashier dispenses and ID instrument to the patron at 706. At 708, the patron may choose to play on a gaming terminal at 710 or go to the cashier 734 to redeem his credit, such as shown at 732.

The patron submits his ID instrument at 712 to the selected gaming terminal that requests transfer of meters associated with the ID instrument from a previous gaming terminal 714 (the gaming terminal on which the patron last played), or alternatively in the case whereby the patron has just remitted funds to a cashier, from the gaming terminal on which the cashier has initialized the meters on. The previous gaming terminal may deny transfer of meters if the credit is exhausted or already paid, thus preventing the patron from playing a game.

Once the transfer of meters from a previous gaming terminal is successfully completed, the patron may repetitively play a game at 716 as long as his credit is not exhausted as shown at 718 or the cash-out signal has not been activated 722, 726. In case credit is exhausted 728, the patron can no longer play and the cashless game session terminates at 730.

After activating the cash-out signal 722, 724, the patron may choose another gaming terminal 708 and proceed as described above. If the patron no longer wishes to play 732, he may go to a cashier 734 to redeem his credit by submitting his ID instrument 736. The cashier may use his network entry terminal to obtain payment authorization from the previous gaming terminal 738. If authorization is given, the credit amount available in the meters of the previous gaming machine may be paid by the cashier 740, and the meters at the previous gaming terminal may be updated to reflect the payment.

Traditionally and in compliance with gaming jurisdictions, gaming terminals may contain a set of highly secure persistent meters comprising essentially the patron's credit balance, the meters associated with a variety of events such as coins inserted and coins given out for a particular game, and an audit log of events for later examination if required. The operation for updating the meters in accordance with the game session activity is commonly referred as metering. Metering also infers that the necessary storage and access means to the meters are available. Applying modern object oriented programming and persistent data storage techniques such as structured access to non-volatile memory, the meters may be defined as a class that is dynamically instantiated at run time. It may be clear to those acquainted with object programming that a multitude of instantiations of the meters class may be obtained, the only limitation being the memory available. Memory being plentiful on a typical computer unit controlling a gaming terminal, a substantial number of instantiations of the meters class may be obtained.

Figure 5:
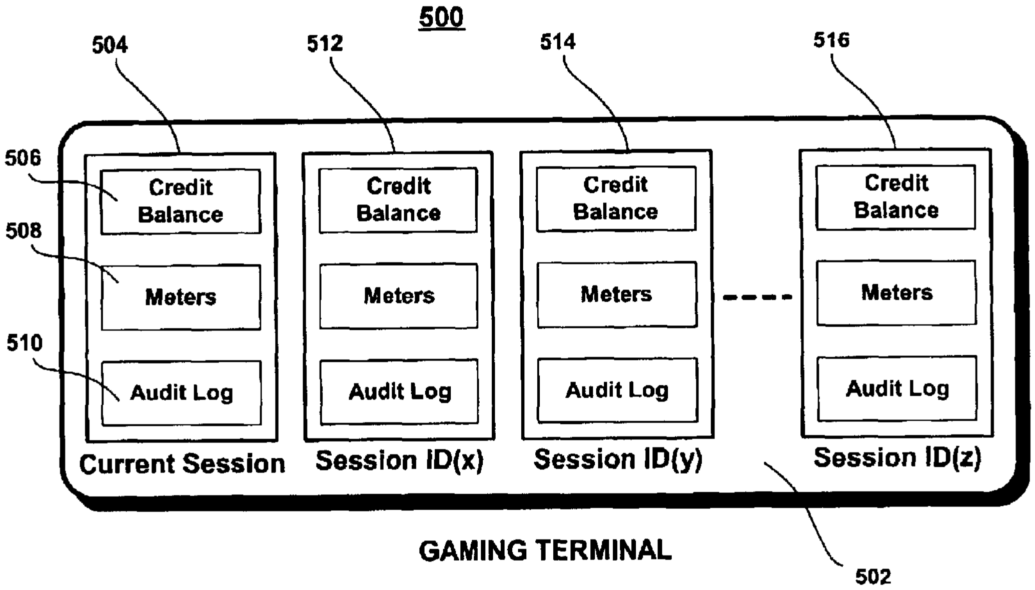
FIG. 5 is a diagram depicting the cashless meters in accordance with an embodiment of the present invention.

FIG. 5 illustrates the instantiation of a number of cashless meters 500 that may be obtained on a gaming terminal 502. The gaming terminal 502 has taken ownership of the cashless meters associated with each of the patrons' submitted ID instrument for ID(x), ID(y) through ID(z) and the gaming activity in process on gaming terminal 502 is reflected in the current session cashless meters 504. The credit balance displayed to the patron currently playing corresponds to the credit balance meter 506; the other meters 508 and the audit log 510 may be reserved for use by the game operator. The cashless meters may be frozen when the patron activates the cash-out signal.

The other meters 512, 514 and 516 are associated with gaming sessions played previously on the gaming terminal 502 and are frozen. Alternatively, any of the meters 512, 514 or 516 may be associated with a new cashless session initiated by the cashier when the patron deposit funds as explained relative to steps 407 to 412. Gaming terminal 502 retain ownership of the frozen meters until ownership is requested by another gaming terminal. If the credit remaining on these meters is exhausted, transfer of ownership to another gaming terminal is denied. If a redeem operation is requested by the cashier terminal or the automated cashier while some credit is available, the gaming terminal 502 authorizes payment, closes the meters and retains ownership of the closed meters. The closed meters may be erased at a later time in order to recover storage space in accordance with the gaming operator's rules for flushing old data.

The peer-to-peer metering method object of the present invention is suitable for supporting all forms of cashless instruments such as:

a player account;

an anonymous game session account;

a voucher verification account;

a time gaming account;

a smartcard reconciliation account.

A cashless player account is identified by a unique identifier key assigned to a patron that points to a set of records stored in computer memory containing the patron's personal details and the state of the cashless session. The records may be queried and updated by authorized software using the key that may be derived from the ID instrument submitted. The state of the cashless session comprises essentially the balance of monetary credit available to the patron (the primary meters) and some auxiliary attributes (secondary meters) reflecting the games played, the time stamping of various operations, a flag indicating if the meters are owned by the gaming terminal hosting the meters and a flag indicating if available credits have already been paid.

An anonymous game session account is identified by a unique identifier key assigned to a game session that points to a set of records stored in computer memory containing the state of the cashless session. The records may be queried and updated by authorized software using the key that may be derived from the ID instrument submitted. The state of the cashless session comprises essentially (the primary meters) the balance of monetary credit available to the anonymous older of the ID instrument and some auxiliary attributes (secondary meters) reflecting the games played, the time stamping of various operations, a flag indicating if the meters are owned by the gaming terminal hosting the meters and a flag indicating if available credits have already been paid.

A voucher verification account is identified by a unique identifier key assigned to a voucher that points to a set of records stored in computer memory containing the state of the cashless session. The records may be queried and updated by authorized software using the key that may be derived from the voucher submitted. The state of the cashless session comprises essentially (the primary meters) the balance of monetary credit available to the holder of the voucher and verification data, and some auxiliary attributes (secondary meters) reflecting the games played, the time stamping of various operations, a flag indicating if the meters are owned by the gaming terminal hosting the meters, and a flag indicating if available credits have already been paid. In the case of a cash-out at the gaming terminal or alternatively when funds are remitted to a human cashier or an automated cashier, a voucher comprising clear text and machine-readable code representing the monetary value of the credit available and some verification data is dispensed. The clear text may indicate the value of the credit available, or simply said for the holder, "the value of voucher". In the case of a cash-in at the gaming terminal or alternatively when requesting the redeem of credits to a human cashier or an automated cashier, a voucher comprising clear text and machine-readable code representing the monetary value of the credit available and some verification data is read. The unique identifier key is derived from the verification data upon reading the clear text and/or the machine-readable code. The associated records are then queried in order to authenticate the value of the voucher by comparing the verification data contained in the records with the verification data read from the voucher. It should be apparent to those acquainted with secure transactional techniques that the unique identifier key, or alternatively the verification data, may be a hash or an encrypted signature of all or portion of the clear text and/or the machine-readable code.

A time gaming account may be associated to a patron or be anonymous.

A time gaming player account is identified by a unique identifier key assigned to a patron that points to a set of records stored in computer memory containing the patron's personal details and the state of the cashless session. The records may be queried and updated by authorized software using the key that may be derived from the ID instrument submitted. The state of the cashless session comprises essentially (the primary meters) the balance of time-to-play and the total of winnings available to the patron, and some auxiliary attributes (secondary meters) reflecting the games played, the time stamping of various operations, a flag indicating if the meters are owned by the gaming terminal hosting the meters and a flag indicating if available credits have already been redeeming.

An anonymous time gaming account is identified by a unique identifier key assigned to a gaming session that points to a set of records stored in computer memory containing the state of the cashless session. The records may be queried and updated by authorized software using the key that may be derived from the ID instrument submitted. The state of the cashless session comprises essentially (the primary meters) the balance of time-to-play and the total of winnings available to the anonymous holder of the ID instrument, and some auxiliary attributes (secondary meters) reflecting the games played, the time stamping of various operations, a flag indicating if the meters are owned by the gaming terminal hosting the meters and a flag indicating if available credits have already been redeeming.

A smartcard reconciliation account is identified by a unique identifier key assigned to a smartcard that points to a set of records stored in computer memory. The records therefor are a "slave" mirrored copy of same records containing the state of the cashless session that are maintained in the electronic circuits of the smartcard. The smartcard maintains the "master" copy of the records. The slaved mirrored records may be queried but not updated by authorized software using the key that may be derived from the smartcard submitted. The state of the cashless session comprises essentially the balance of credit available to the holder of the smartcard (the primary meters) and some auxiliary attributes (secondary meters) reflecting the games played, the time stamping of various operations, a flag indicating if the meters are owned by the gaming terminal hosting the meters and a flag indicating if available credits have already been paid. The slaved mirrored records are used to reconcile accounting when the smartcard is used in order to detect possible forgery. Alternatively, the slaved mirrored records are used as a backup repository to pay the holder of the smartcard in case of the failure of the smartcard. When used for backup, the "slave" records may be updated by authorized software using the key that may be derived from the smartcard submitted (embossed code for example).

The ID instrument used to derive the unique identifier key may be submitted in a variety of ways such as typing a user ID and password, keying-in a code on a keypad, presenting a bar-coded voucher, an encoded card, a secure electronic ID device or recognizing biometric features.

The unique identifier keys are commonly called GUI or global unique identifier.

Fault tolerance may be achieved by replicating (mirroring) cashless meters owned by a given gaming terminal to a predetermined number of other peer gaming terminals. The gaming terminals holding replicated cashless meters are second-level owners that may be solicited in case the primary owner does not respond to the initial transfer request, whether the request is a direct one to an identified gaming terminal or broadcast to all gaming terminals on the network. For example, in case gaming terminal 403 does not obtain any reply subsequent to its transfer request broadcast 417 after a time-out, a new broadcast message explicitly soliciting secondary owners may be sent on the network. Gaming machine 403 would then accept the transfer of cashless meters from a responding secondary owner.

In another embodiment of the present invention, the gaming terminal may be able to encode information on the ID instrument submitted by the patron. The identification of the gaming machine used by the patron may advantageously be encoded on the ID instrument such that the next used gaming terminal knows immediately upon reading the ID instrument the identity of the previously used gaming terminal. Consequently, the next used terminal may establish network communication with the previously used gaming terminal without having to rely on network broadcasting techniques to find out which of the connected gaming terminals is the last used gaming terminal, thus reducing the time to start transferring the meters and the overall network traffic. In case the last gaming terminal is not contactable, a network broadcast to find a secondary owner of the meters may be initiated.

Conclusions

The invention offers a simple distributed peer-to-peer metering of cashless game sessions that is secure, robust, scalable and that requires no central system.

All the sensitive operations are carried out by the secure software (preferably certified by a recognized test laboratory) that executes in each gaming machine. All the access points to any of the gaming terminals such as the cashier terminal or the automated cashier require only basic stateless client applications operating over a secure network protocol such as IPSec or SSL. Moreover, sophisticated relational databases are not required. Wireless laptops or palmtops may be advantageously used as entry or control terminals.

The invention supports all forms of cashless instruments such as:

a player account whereby primary meters are the monetary credit balance associated to a patron ID;

an anonymous game session account whereby primary meters are the monetary credit balance associated to a game session ID;

a voucher verification account whereby the primary meters are the monetary value and the hash associated to the value amount and the encrypted signature printed or encoded on the voucher;

a time gaming account whereby the primary meters are the time-to-play balance and the total of the winnings associated to a patron ID or to a game session ID;

a smartcard reconciliation account whereby the primary meters are a mirrored copy of the meters managed in the secure electronic module of the smartcard.

The invention may be advantageously deployed for small to medium size game operators.

What is claimed is:

1. A method for metering a cashless game session played by a patron on a network including a plurality of networked gaming terminals, the method comprising the stops of:

a) initializing meters assigned to the game session with a credit amount corresponding to funds received from the patron in a predetermined first gaming terminal of the plurality of networked gaming terminals;

b) if the patron does not initiate the gaming session on the first gaming terminal, transferring the meters assigned to the game session over the network from the meters in the first gaming terminal directly to meters in whichever gaming terminal of the plurality of networked gaming terminals on which the patron initiates a gaming session, the transferring being requested by the gaming terminal on which the patron initiates a gaming session;

c) metering the game session activity in the gaming terminal on which the patron initiates a gaming session;

d) transferring the meters assigned to the game session over the network directly to meters in whichever gaming terminal of the plurality of networked gaming terminals on which the patron initiates a gaming session, the transferring being requested by the gaming terminal on which the patron initiates a gaming session, and repeating steps c) and d) as and if needed until the credit amount associated with the meters assigned to the game session is exhausted or a cash-out is requested by the patron.

2. The method of claim 1, wherein the plurality of gaming terminals operate in a peer-to-peer fashion.

3. The method of claim 1, further including a step of issuing a unique ID instrument, the issued ID instrument being associated with the meters assigned to one of the selected one of a player account, an anonymous game session account, a voucher verification account, a time gaming account and a smartcard reconciliation account.

4. The method of claim 3, further including reading and validating the issued ID instrument prior to enabling the patron to initiate a gaming session.

5. The method of claim 3, wherein an entry terminal is connected to the network, and upon receiving a cash-out request by the patron at the gaming terminal and validating the patron's ID instrument at the gaming terminal carrying out steps of:

the network entry terminal requesting payment authorization from a last gaming terminal on which the patron initiated a gaming session, and paying the patron an amount corresponding to a remaining credit in the meters stored in the last gaming terminal on which the patron initiated a gaming session.

6. The method of claim 5, wherein the network connected entry terminal is one of automatic and operated by a cashier.

7. The method of claim 5, wherein a network broadcasting step is carried out by the network entry terminal to determine the last gaming terminal on which the patron initiated a gaming session.

8. The method of claim 5, wherein the meters stored on the last gaming terminal an which the patron initiated a gaming session are updated to reflect payment to the patron.

9. The method of claim 5, wherein the network entry terminal is stateless.

10. The method of claim 9, wherein the network entry terminal includes one of a web browser and a stateless application that does not manage or record a state or context of the game session.

11. The method of claim 3, further including a step of a last gaming terminal on which the patron initiated a gaming session denying payment to the patron if the credit amount associated with the meters assigned to the same session is zero or if the credit amount associated with the meters assigned to the game session has already been paid.

12. The method of claim 1, wherein the transfer steps are carried out securely.

13. The method of claim 1, wherein the transferring steps are carried out at least partly wirelessly.

14. The method of claim 1, wherein the transferring steps are carried out securely and at least partly wirelessly.

15. The method of claim 1, further comprising the step of providing a plurality of entry terminals connected to the network, to allow patrons to deposit funds and to be paid.

16. The method of claim 15, wherein the entry terminals are one of operated by a cashier and automatic.

17. The method of claim 3, wherein the ID instrument is anonymous.

18. The method of claim 3, wherein the ID instrument is associated with a personal information of the patron.

19. The method of claim 3, wherein the ID instrument includes at least one of a printed ticket with text and/or an encoded barcode, a printed ticket with text and/or embedded encoded magnetic strip, a magnetic ID card, a smart ID card, biometric recognition, an ID button, an ID key-chain, a personal electronic wallet, a secure handheld Computer, a secure mobile phone, a secure computer wrist watch and a keyboard or keypad and username, password combination.

20. The method of claim 3, wherein the ID instrument is associated with a membership of the patron.

21. The method of claim 1, wherein a network broadcasting step is carried out prior to step d) to determine which of the plurality of networked gaining terminals currently stores the meters assigned to the game session.

22. The method of claim 3, wherein the ID instrument is configured to store an identifier of a last gaming machine on which the patron initiated a gaming session.

23. The method of claim 22, further comprising steps of:

denying, by the last gaming terminal, a transfer request to transfer meters to another gaming terminal if a credit associated with the ID instrument submitted is exhausted, and preventing, by the last gaming terminal, the patron from playing the gaming terminal to which the ID instrument is submitted when the transfer request is denied.

24. A system for metering cashless game sessions for a plurality of networked gaming terminals comprising:

at least one ID instrument;

at least one network connected entry terminal comprising:

means of accepting and/or dispensing the at least one 1) instrument;

computer means of interacting with the networked gaming terminals;

each of the plurality of gaming terminals comprising:

means of accepting the at least one ID instrument submitted by a patron;

gaming means for the patron to play;

metering means configured to store the context of the game session activity;

meters associated with the at least one ID instrument and stored in the metering mews;

computer means to transfer, upon request, the meters directly to a requesting one of the plurality of networked gaming terminals;

computer means to request and accept the transfer of the meters directly from another of the plurality of networked gaming terminals;

a cash-out function, and processing means to authorize or deny payment requested by the at least one cashier network entry terminal.

25. The system of claim 24, wherein the ID instrument includes at least one of a printed ticket with text and/or an encoded barcode, a printed ticket with text end/or embedded encoded magnetic strip, a magnetic ID card, a smart ID card, biometric recognition, an ID button, an ID key-chain, a personal electronic wallet, a secure handheld Computer, a secure mobile phone, a secure computer wrist watch and a keyboard or keypad and username, password combination.

26. The system of claim 24, wherein the ID instrument is associated to one of the selected one of a player account, an anonymous game session account, a voucher verification account, a time gaming account and a smartcard reconciliation account.

27. The system of claim 24, wherein the plurality of gaming terminals are networked and operate in a peer-to-peer fashion.

28. The system of claim 24, wherein the computer means to request transfer are configured to one of:

broadcast the requests over the network, and request the meters from an identified one of the plurality of networked gaming terminals.

29. The system of claim 24, wherein the ID instrument is configured to store an identification of a last played gaming terminal of the plurality of gaming terminals.

30. A method for metering cashless game sessions for an estate of networked gaming terminals comprising the steps of:

a) using one of at least one network connected entry terminal to initialize first meters located on a predetermined first gaming terminal within the estate with a credit amount corresponding to funds deposited by a patron, the first meters being associated with an ID instrument;

b) issuing the ID instrument to the patron;

c) denoting the first gaming terminal as a previous gaming terminal and denoting the first meters as previous meters;

d) repeating step e) to i) each time the patron selects a new gaming terminal from the estate, and proceeding to step k) when the patron wishes to redeem the credit amount;

e) the new gaming terminal accepting the ID instrument from the patron;

f) the new gaming terminal requesting the previous gaming terminal to transfer the previous meters;

g) directly transferring the previous meters from the previous gaming terminal into new meters located on the new gaming terminal;

h) the new gaming terminal metering the gaming of the patron using the new meters until a cash-out signal is activated;

i) denoting the new gaming terminal as the previous terminal and denoting the new meters as the previous meters;

j) using one of the at least one network connected entry terminal to request the previous gaming terminal to authorize payment of credit associated with the ID instrument;

k) the previous gaming terminal returning an authorization for the payment to the requesting network connected entry terminal;

l) the previous gaming terminal updating the previous meters to reflect the payment, and m) paying the payment to patron.

31. The method of claim 30, wherein steps a) and j) are carried out using at least one stateless network-connected entry terminal.

32. The method of claim 31, wherein the network-connected entry terminal includes one of a web browser and a stateless application that does not manage or record a state or context of the game session.

33. The method of claim 30, wherein the previous gaming terminal denies payment for the ID instrument in step k if the credit of the previous meters is exhausted or has already been paid.

34. The method of claim 30, wherein each step that includes communication over the network is carried out securely.

35. The method of claim 30, wherein each step that includes communication over the network is carried out at least partly wirelessly.

36. The method of claim 30, wherein each step that includes communication over the network is carried out securely and at least partly wirelessly.

37. The method of claim 30, further including an initial step of providing a plurality of stateless network-connected entry terminals operated by cashiers to allow patrons to deposit funds and to redeem credits, the plurality of stateless network-connected entry terminals including at least one of a web browser and a stateless application that does not manage or record a state or context of the game session.

38. The method of claim 30, wherein the ID instrument includes at least one of a printed ticket with text and/or an encoded barcode, a printed ticket with text and/or embedded encoded magnetic strip, a magnetic ID card, a smart ID card, biometric recognition, an ID button, an ID key-chain, a personal electronic wallet, a secure handheld computer, a secure mobile phone, a secure computer wrist watch and a keyboard or keypad and username, password combination.

39. The system of claim 30, wherein the ID instrument is associated to one of the selected one of a player account, an anonymous game session account, a voucher verification account, a time gaming account and a smartcard reconciliation account.

40. The method of claim 30, wherein the ID instrument is anonymous.

41. The method of claim 30, wherein the ID instrument is associated with a personal information of the patron.

42. The method of claim 30, wherein the ID instrument is associated with a membership of the patron.

43. The method of claim 30, wherein requests to transfer meters use network broadcasting wherein the requests are broadcast to each of the operating gaming terminals in the estate.

44. The method of claim 30, wherein the ID instrument is configured to store an identifier of the gaming machine on which the patron last played, the identifier being read by the network connected entry terminal or by a selected one of the gaming terminals of the estate to enable the selected one gaming terminal to use the stored identifier to directly contact the gaming machine which the patron last played in lieu of network broadcasting.

45. The method of claim 30, wherein the new gaming terminal terminates the gaming of the patron at step h) if the credit amount is exhausted.

46. The method of claim 30, wherein step j) enables the patron to request full or partial payment on any remaining credit.

47. The method of claim 30, further comprising a step of mirroring meters for each gaming terminal of the estate having an active gaming session in at least one other predetermined gaming terminal of the estate to achieve fault tolerance, the at least one other predetermined gaming terminal being configured to provide the mirrored meters to a requesting network connected entry terminal or a requesting gaming terminal upon of failure of a requested gaming terminal to respond to a request for meters.

48. The method of claim 30, wherein each of the at least one network connected entry terminals is integrated within a respective gaming terminal of the estate.

49. The method of claim 30, wherein the at least one network connected entry terminal is configured to be operated by a human cashier.

50. The method of claim 30, wherein the at least one network connected entry terminal is automated.

51. The method of claim 30, wherein the at least one network-connected entry terminal is stateless.

52. The method of claim 51, wherein the network-connected entry terminal includes one of a web browser and a stateless application that does not manage or record a state or context of the game session.

* * * * *

UNITED STATES PATENT AND TRADEMARK OFFICE

CERTIFICATE OF CORRECTION

PATENT NO. : 6,916,244 B2 Page 1 of 1
DATED : July 12, 2005
INVENTOR(S) : Jean-Marie Gatto and Thierry Brunet de Courssou It is certified that error appears in the above-identified patent and that said Letters Patent is hereby corrected as shown below:

Column 11,
Line 26, replace “stops” with -- steps --.

Column 12,
Line 18, replace “an” with -- on --.
Line 29, replace “same” with -- game --.
Line 32, replace “transfer” with -- transferring --.

Column 13,
Line 8, replace “1)” with -- ID --.
Line 19, replace “mews” with -- means --.
Line 31, replace “end/or” with -- and/or --.

Column 15,
Line 17, after “machine”, insert -- on --.

Signed and Sealed this

Thirteenth Day of September, 2005

JON W. DUDAS
*Director of the United States Patent and Trademark Office*